Nov. 18, 1924.
U. G. SHIPMAN
1,515,626
CONVERTIBLE END GATE
Original Filed May 7 1923  2 Sheets—Sheet 1
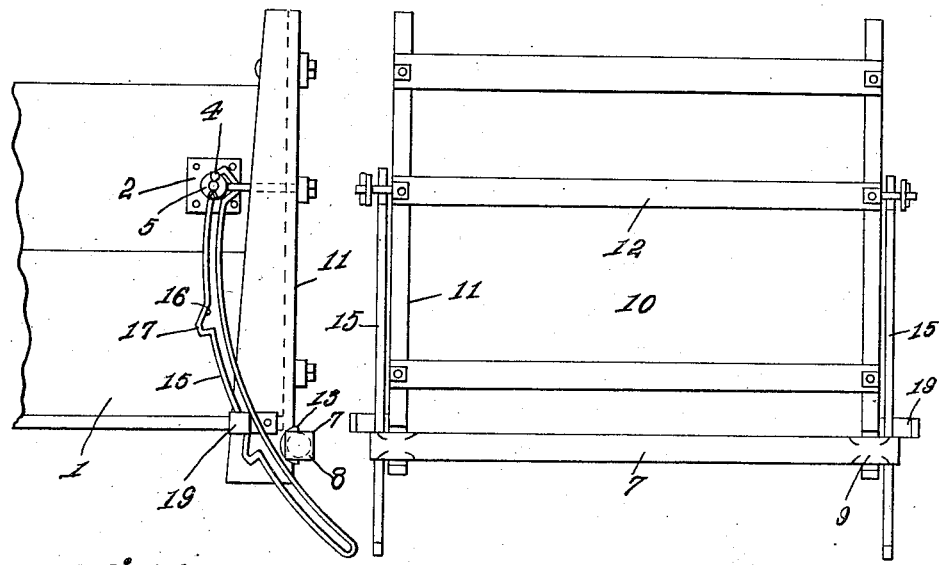
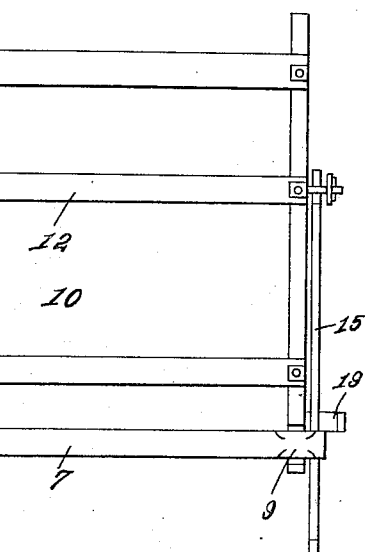
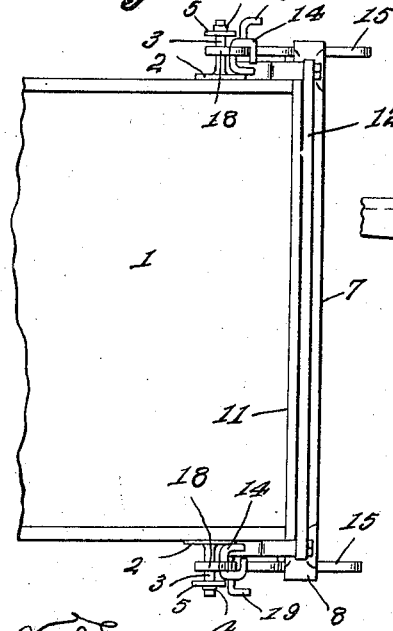
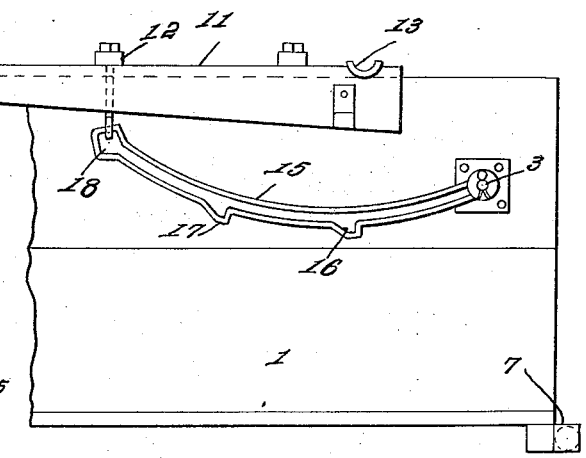
U. G. Shipman
INVENTOR
BY Victor J. Evans
ATTORNEY
WITNESS:

Nov. 18, 1924.
U. G. SHIPMAN
1,515,626
CONVERTIBLE END GATE
Original Filed May 7 1923   2 Sheets-Sheet 2
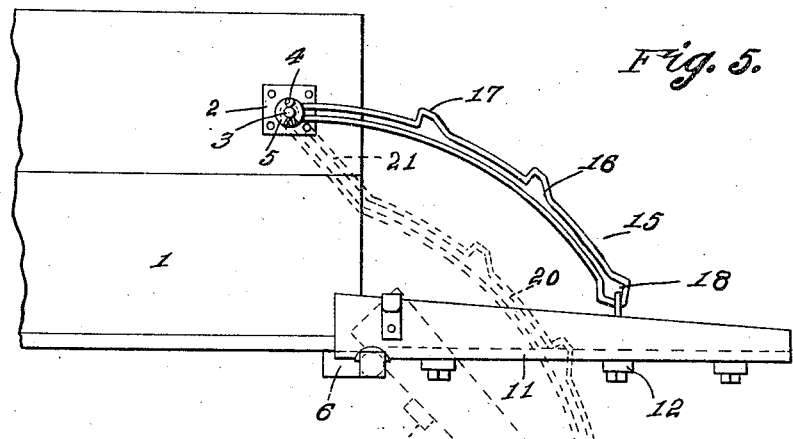
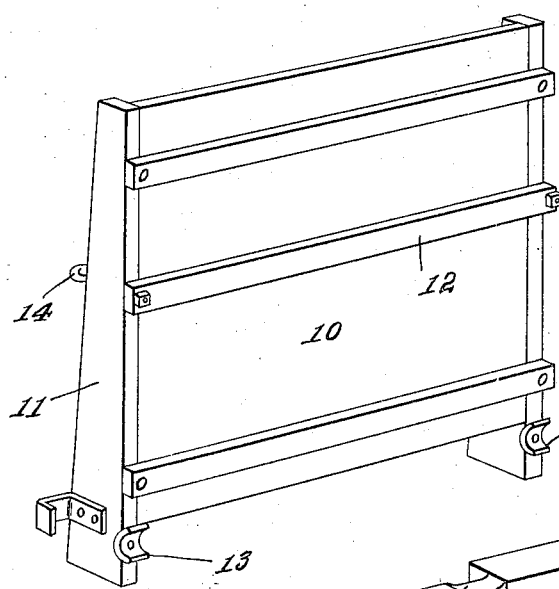
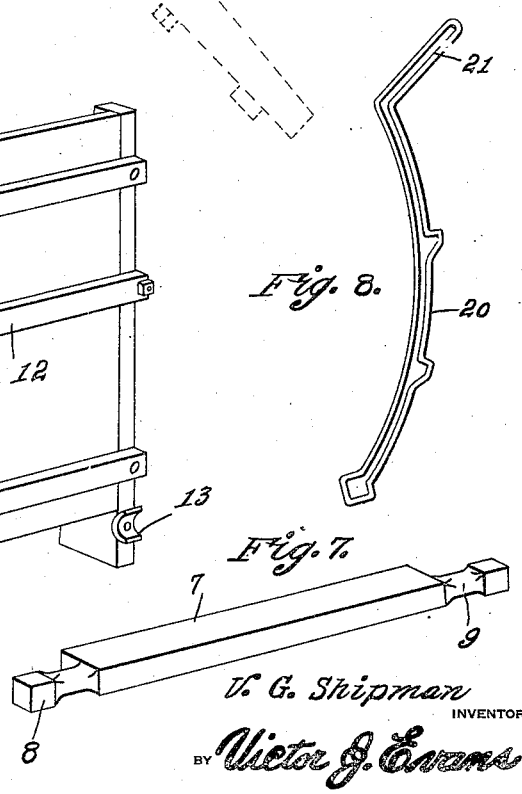
U. G. Shipman
INVENTOR
BY Victor J. Evans
ATTORNEY
WITNESS:

Patented Nov. 18, 1924.

1,515,626

UNITED STATES PATENT OFFICE.

ULYSSESS G. SHIPMAN, OF O'NEILL, NEBRASKA.

CONVERTIBLE END GATE.

Application filed May 7, 1923, Serial No. 637,313. Renewed October 6, 1924.

*To all whom it may concern:*

Be it known that I, ULYSSESS G. SHIPMAN, a citizen of the United States, residing at O'Neill, in the county of Holt and State of Nebraska, have invented new and useful Improvements in Convertible End Gates, of which the following is a specification.

An object of this invention is to provide an end gate or scoop board for vehicles, either wagons or automobile truck bodies which is of such construction and so supported as to permit of the same being arranged at desired angles on the vehicle body, positioned thereover but held tightly thereagainst when in closed position.

A further object is to produce an end gate in the nature of a scoop board for vehicle bodies, whose sides are projected beyond the ends of the scoop board proper and rest on a supporting beam that is secured to the lower corner of the vehicle body, while slotted links are pivotally associated with the scoop board and are removably mounted for sliding movement on trunnions secured to the sides of the vehicle body, said links at intervals having notched portions designed for engagement with the trunnions in accordance with the angular position of the scoop board on the body and being further of such construction as to coengage with the trunnions for holding the scoop board tightly closed against the body and also permitting the said board being elevated to rest upon the top of the wagon body.

With these and other objects in view, this invention will be better understood from the following detailed description taken in connection with the accompanying drawings wherein:—

Figure 1 is a fragmentary side elevation of a vehicle body provided with a scoop board in accordance with this invention, the latter being in position to close the end of the body.

Figure 2 is a rear elevation thereof.

Figure 3 is a top plan view thereof.

Figure 4 is a side elevation but showing the scoop board swung over and resting on the top of the body.

Figure 5 is a side elevation showing in full lines the scoop board arranged in open horizontal position, and in dotted lines the scoop board resting on the ground.

Figure 6 is a perspective view of the scoop board.

Figure 7 is a similar view of the supporting bar or beam for the scoop board that is attached to the vehicle body.

Figure 8 is a view of a modified form of slotted link which may be employed.

Again referring to the drawings, the numeral 1 designates a vehicle body. The body may be that of an ordinary wagon or of a motor propelled truck. On the sides of the body, adjacent to the outer end thereof there are secured plates 2 having outwardly directed short shafts or trunnions 3. The trunnions are apertured for the reception of a cotter pin 4 that holds a washer 5 on each short shaft or trunnion.

Secured to the lower and outer corner transverse supporting beam 6 of the body 1 there is a bar 7. The bar may be and preferably is in the nature of a wooden beam and has its ends, at its outer corners reduced and formed with extensions 8. Each of the extensions is notched a distance from the outer ends thereof to provide cross sectionally rounded bearings 9 respectively.

The body of my improved scoop board includes a face 10, sides 11 and suitable brace bars 12 between the face and the sides. The sides 11 project beyond one end of the face 10. Preferably the sides 11 have their outer or free edges inclined so that the end portions of the sides are of a greater width than their opposite ends. The sides 11 at the portions thereof that project just beyond the face board 10 have rounded notches which receive therein segmental wear plates 13, and these plates 13 are designed for normal engagement with the rounded bearings 9 on the bar 7.

The free edges of the sides 11 of the scoop board are provided with opposed eyes 14 that receive therethrough slotted links or levers 15. The links or levers 15 are, of course, in the nature of metal members and are arched in plan. What I, for distinction, will term the outer arm of each of the links 15 and which I have, in the drawings, designated by the numeral 16, is provided on its inner edge with any desired number of spaced notches 17, and the end of each of the links 15 which is connected to the eye 14 of the scoop board is widened by forming the arms thereof with angle bends, the said widened portion being substantially V-shaped in plan and is indicated by the numeral 18. The links receive the trunnions 3 therethrough after the cotter pin is removed to permit of the washer being likewise removed, and these elements are again replaced. The links are of such lengths as to normally sustain the scoop board in horizontal position with respect to the bottom of the vehicle body when the scoop board is in full open position. By removing the cotter pins and washers the scoop board may be brought to a downward angle permitting the same to rest on the ground, as indicated by the dotted lines in Figure 5 of the drawings, so that animals may be made to travel over the board into the body. By swinging the scoop board to arrange any of the notches 17 over the trunnions 3 the scoop board is sustained at desired upward angles, and when the scoop board is swung to closed position the widened end 18 of the links 15 will engage with the trunnions. To tightly sustain the board in this position, the downwardly arranged lips are brought over brackets 19 secured to the projecting portions of the sides 11 of the said board. This arrangement tightly locks the board against the end of the vehicle body to provide a grain-tight closure therefor.

Under certain conditions, it is desirable that the scoop board be moved away from the end of the body 1, and by reference to Figure 4 of the drawings, it will be seen that by moving the board and its links, the said board may be brought to rest over the top of the vehicle body.

A scoop board and the supporting and sustaining means therefor may be cheaply manufactured and easily installed upon any vehicle body. The board permits of live stock being directed on to and delivered from the vehicle body in a comparatively easy and in an expeditious manner and also provides an effective means for unloading grain. It is to be understood that I do not wish to be restricted to the precise details of construction herein set forth as I hold myself entitled to such changes therefrom as fall within the scope of what I claim.

In Figure 8 of the drawings I have illustrated a modified form of link, indicated by the numeral 20. The link has an offset end 21 which permits of the scoop board being arranged below the horizontal plane.

A scoop board and the supporting and sustaining means therefor, constructed as above described, may be cheaply manufactured and attached to any vehicle body. I reserve the right to manufacture the scoop board entirely of lumber, part lumber and metal, steel or galvanized iron, or part or all of iron, steel or galvanized iron.

Having described the invention, I claim:—

A vehicle body having trunnions on its sides, adjacent its rear and open end, a bar secured to the lower corner of the said end of the body projecting therebeyond and notched to provide cross sectionally round bearings, a scoop board having sides which extend beyond one end thereof and which are notched, curved wear plates in the notches to be received on the bearings of the bar, curved slotted links each having one arm notched at spaced intervals and widened at one end pivotally secured to the scoop board and guided over the trunnions, and means removable on the trunnions sustaining the links thereon.

In testimony whereof I affix my signature.

ULYSSESS G. SHIPMAN.